June 12, 1923.  
J. E. HIRST  
WOODWORKING MACHINERY  
Filed Jan. 22, 1923  
1,458,411  
2 Sheets-Sheet 1
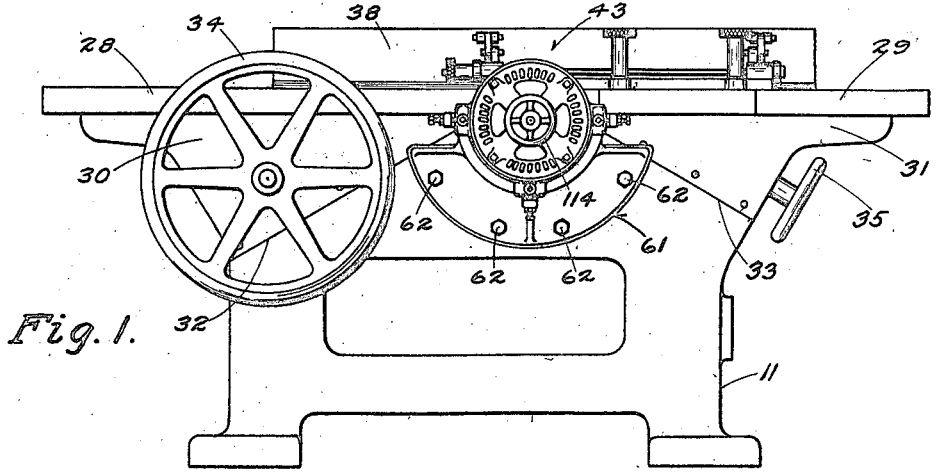
Fig. 1.
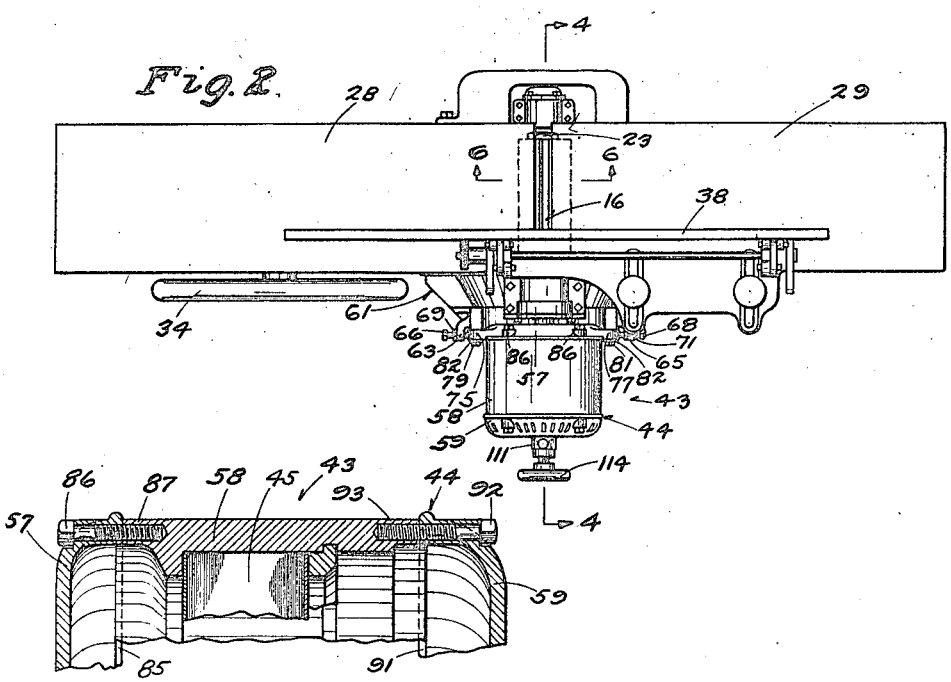
Fig. 2.
Fig. 7.
Inventor:
James E. Hirst,
by his Attorney.

June 12, 1923.
J. E. HIRST
WOODWORKING MACHINERY
Filed Jan. 22, 1923
1,458,411
2 Sheets-Sheet 2
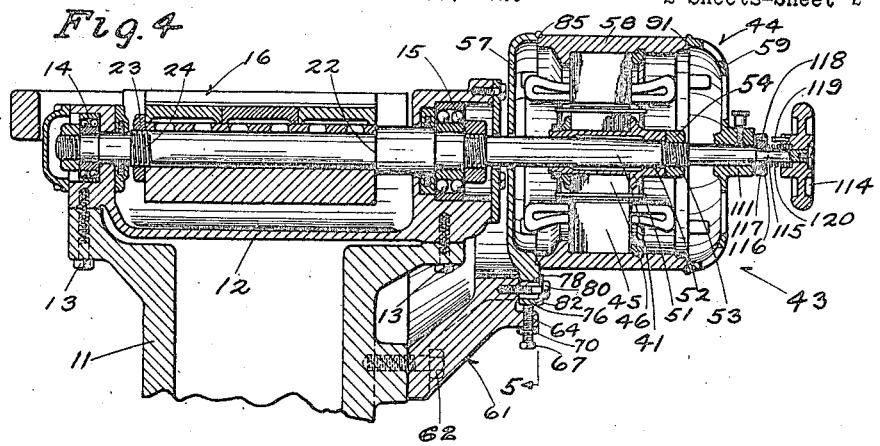
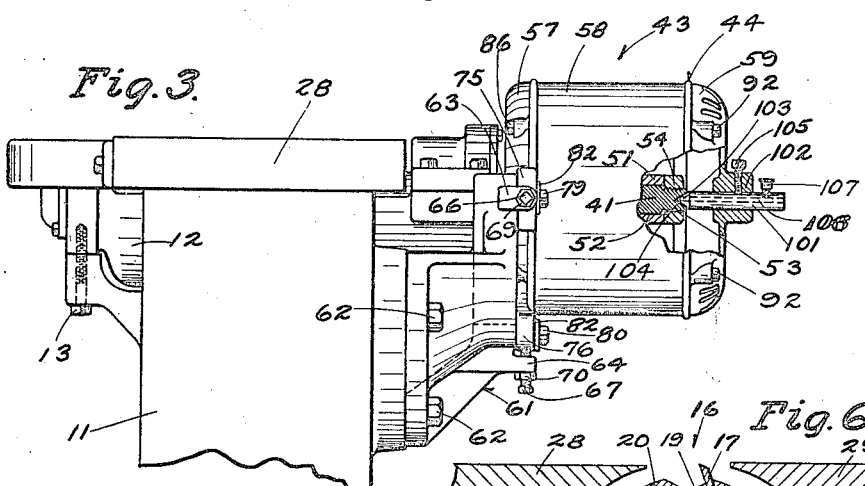
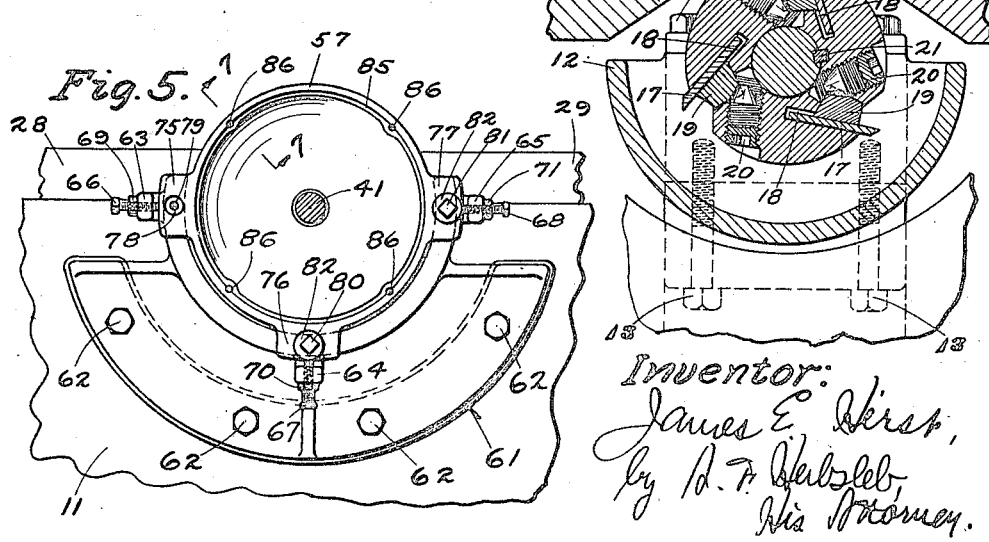
Inventor:
James E. Hirst,
by his Attorney.

Patented June 12, 1923.

1,458,411

UNITED STATES PATENT OFFICE.

JAMES E. HIRST, OF CINCINNATI, OHIO, ASSIGNOR TO J. A. FAY & EGAN COMPANY, OF CINCINNATI, OHIO, A CORPORATION OF WEST VIRGINIA.

WOODWORKING MACHINERY.

Application filed January 22, 1923. Serial No. 614,067.

*To all whom it may concern:*

Be it known that I, JAMES E. HIRST, a citizen of the United States, residing at Cincinnati, in the county of Hamilton and State of Ohio, have invented certain new and useful Improvements in Woodworking Machinery, of which the following is a specification.

My invention relates to wood-working machinery, especially of that character provided with means for driving the cutter-spindle by means of an electric motor.

Great difficulty had been experienced heretofore in driving cutter-spindles in wood-working machines direct by an electric motor in which the rotor was direct-connected with the cutter-spindle due to interference in the electric force caused by yielding of that portion of the spindle to which the rotor was connected, and thereby disarranging the proper relation between the rotor and the stator of the electric motor.

It is the object of my invention to overcome these objections by novel means; further, to provide novel means whereby to secure the rotor of the electric motor direct to the cutter-spindle; and, further, to provide novel means whereby to maintain the rotor of the electric motor in axial line with the cutter-spindle and to maintain concentricity of said rotating element with the stationary element of the electric motor concerned in producing the power effect in the electric motor.

It is the object of my invention, further, to provide a wood-working machine with a cutter-spindle having an overhanging end, and to secure the rotating element of the electric motor to this over-hanging end; further, to provide novel means for supporting the outer portion of the overhanging end of the cutter-spindle to maintain the rotating element of the electric motor in its proper relation to the stationary element thereof complemental thereto; further, to provide a wood-working machine with a cutter-spindle journaled in bearings so as to have an overhanging end, and having the wood-cutting device secured to the spindle between said journals, and to provide the overhanging end of the cutter-spindle with the rotating element of the electric motor and a steadying device for the outer portion of the overhanging end of the cutter-spindle to maintain the rotating element of the motor in its proper path of rotation; further, to provide novel means for supporting the electric motor and the outer steadying device for the cutter-spindle bracketwise from the main frame of the wood-working machine; and, further, to provide novel adjusting means for the latter whereby to maintain the rotating parts in concentric relations.

The invention will be further readily understood from the following description and claims, and from the drawings, in which latter:

Fig. 1 is a side elevation of an exemplifying wood-working machine, represented as a so-called hand planer and jointer, having my improved device applied thereto.

Fig. 2 is a plan view of the same.

Fig. 3 is an end elevation of the same, partly broken away, and showing a different form of steadying device from that shown in Figs. 1 and 2.

Fig. 4 is a vertical axial section, taken on the line 4—4 of Fig. 2.

Fig. 5 is an end elevation showing the bracket supporting and adjusting means, partly in section in the plane of the line 5 of Fig. 4, the body of the electric motor being removed.

Fig. 6 is a cross-section, taken on the line 6—6 of Fig. 2; and,

Fig. 7 is a sectional detail view, taken in the plane of the line 7—7 of Fig. 5.

In the present exemplification of my invention, I show and describe a so-called hand planer and jointer as the wood-working machine of my invention, although it is obvious that my invention is applicable to other wood-working machines in which a cutter-spindle carrying a wood-cutting device is rotated by an electric motor.

In the present exemplification of my invention 11 represents the machine-frame of the wood-working machine. The machine-frame comprises a spindle-support for a cutter-spindle, which is instanced as a housing 12, secured to the main frame by bolts 13. The housing comprises bearings 14, 15, represented as ball-bearings, suitably adjustable for properly holding the cutter-spindle against lateral vibration and endwise movement.

A wood-cutting device, represented as a cutter-head 16, is secured to the cutter-spindle. The cutter-head is represented as a so-called solid cutter-head of substantially cylindrical form, in which cutter-blades 17 are suitably clamped in recesses 18, by means of wedge-blocks 19 in the recesses and clamped toward the cutter-blades by means of wedge-bolts 20. The cutter-head is fixed to the cutter-spindle by being received securely about the spindle and having rotative connection therewith, for instance by means of a key 21, and being clamped between a shoulder 22 on the cutter-spindle and a nut 23 threaded over a threaded portion 24 of the cutter-spindle.

The wood-working machine is provided with suitable work-supporting tables 28, 29, suitably fixedly or adjustably held on slides 30, 31, adjustable along guides 32, 33, by means of hand-wheels 34, 35, having suitable operative connection with said slides. A side-gauge 38 for the work is suitably positioned and adjusted.

The wood-cutting device is secured to the cutter-spindle between the bearings 14, 15, and the spindle is provided with an overhanging end 41, which is shown integral with the spindle.

An electric motor 43 comprises a motor-frame 44, a stator 45, fixed to the motor-frame, and a rotor 46 within the stator. The electric motor is shown of the induction motor type, in which the electric force or flux causes rotation of the rotor by induction between the stator and the rotor. The stator and the rotor are each provided with suitable windings for a motor of this character, which are not more particularly shown and described as they are well known. The motor is shown as a shaftless motor, that is to say, the rotor thereof is not mounted on a motor-shaft having bearings in the motor-frame, but is normally loose with relation to the motor-frame and the stator, and receives its support by being secured to the cutter-spindle.

In practice, in a motor of this character, the outer periphery of the rotor must be concentric with the inner periphery of the stator, and the peripheries are in close relation having in practice approximately about sixteen thousandths of an inch clearance between them, which clearance must be maintained for proper operation of the motor. If concentricity between the peripheries is not maintained, or if, due to the torque between the rotor and the cutter-head, there is a disarrangement of such concentricity, causing eccentricity between the peripheries, or touching of one periphery with the other, there is a disturbance of the electric forces, causing loss of power or stoppage of the rotor, and possible injury to the motor.

I have provided novel means for maintaining such concentricity and preventing eccentric relation between the outer periphery of the rotor and inner periphery of the stator, for maintaining maximum capacity in the electric motor, and preventing distortion or disarrangement between the rotor and the cutter-spindle.

I extend the cutter-spindle integral with the supporting portion thereof for the woodworking device, to form an overhanging end, and I mount the electric rotor of the electric motor on this overhanging end. For mounting the rotor on the overhanging end, I construct the overhanging end preferably of taper form, and provide the rotor with a sleeve 51, which has a complemental taper bore 52. The overhanging portion of the cutter-spindle has a threaded portion 53, over which a nut 54 is threaded, for clamping the sleeve of the rotor to the spindle, causing the taper wall of the bore of the sleeve to be moved clampingly along the taper portion of the spindle, for firmly securing the same together and causing the rotor to be concentric on the spindle.

I further provide means for holding the outer end of the spindle concentric with the portion thereof which has the wood-cutting device thereon, and for maintaining the outer end of the spindle in axial line with said cutter-carrying portion, and for preventing vibration of such outer end, whereby the concentric arrangement between the rotor and the stator of the electric motor, when once established, is maintained.

I further provide means for positioning the stator of the electric motor concentric with relation to the cutter-spindle and for maintaining such concentricity.

Thus in the present exemplification the motor-frame comprises an end-wall 57, a body 58, shown as a stator supporting cylinder, and an outer end-wall 59. The motor is supported bracketwise from the machine-frame, exemplified as accomplished by means of a bracket 61, secured to the machine-frame by bolts 62. The bracket is shown in the form of a sector of a frusto-cone, and provided with lugs 63, 64, 65, in which adjusting bolts 66, 67, 68, are threaded, jam-nuts 69, 70, 71, maintaining the adjusting bolts in adjusting positions.

The end-wall 57 of the electric motor is provided with lugs 75, 76, 77, having enlarged holes 78 therein, through which clamp-bolts 79, 80, 81, are received, for clamping the end-wall 57 in adjusted position to the bracket, the clamp-bolts being threaded into the bracket, and having washers 82 between their heads and the lugs on the end-wall 57. The holes 78 are larger than the shanks of the bolts to permit adjustments of said end-wall in all directions.

The body 58 of the motor is shown as a cylindrical casing for the stator, and has an annular tongue and rabbet connection 85 between it and the end-wall 57. The body and the end wall 57 are clamped together by means of bolts 86 between said end-wall and said body, being threaded in lugs 87 in the body, for clamping the two together with said tongue and rabbet connection in concentric seated relation.

The end-wall 59 and the body of the motor have a concentric tongue and rabbet connection 91 between them, this end-wall being secured to the body by means of clamp-bolts 92 threaded into lugs 93 in the body, for clamping the end-wall to the body, with the tongue and rabbet in concentric relation.

I prefer to provide a steadying part between the outer end of the overhanging end of the cutter-spindle and the outer end of the motor-frame. This in Fig. 3 is shown as comprising a stem 101 which is located in a bearing 102 in the end-wall 59 of the motor-frame. Its inner end is shown conical at 103, received in a conical recess 104, in the outer end of the overhanging end of the cutter-spindle. A set-bolt 105 is threaded into the bearing 102, and clamps the stem in axial position, the rod being capable of axial movement for maintaining journal relation between the conical faces. The stem is provided with an axial channel 106 with which a suitable oil-cup 107 connects, for oiling the journal between the stem and the outer end of the overhanging end of the cutter-spindle.

I have, in Figs. 1, 2 and 4, shown the end steadying means for the overhanging end of the cutter-spindle as a bearing 111, this bearing 111 being shown in the end-wall 59 of the electric motor.

The outer end of the overhanging end of the cutter-spindle is journaled in this bearing. This outer bearing is in axial line with the bearings 14, 15, of the cutter-spindle, between which the cutter-head is located, the rotor of the electric motor being located between the inner one of these last-named bearings and the outer bearing or steadying part mentioned.

The cutter-spindle is thereby maintained in true axial line throughout its whole length and is preferably integral throughout and maintains concentric relations of rotation of the wood-cutting device or cutter-head and the rotor of the electric motor.

In practice, there is considerable resistance between the wood-cutting device and the rotor, when the rotor is started, to rotate the wood-cutting device, even in idle relation, resulting in a tendency to cause a torque yield or twisting between the rotor and wood-cutting device and a lateral yield of the rotor with relation to the wood-cutting device, due to the electric force between the stator and the rotor and the resistance of the wood-cutting device, such tendencies of yield and yields also taking place after the devices are in operation and when they are subjected to the cutting strains of the wood-cutting device.

I avoid all yields of the character mentioned by means of my improved device, and insure true axial and concentric positions of all the related elements by means of the adjustments I have provided.

It is desirable at times to rotate the wood-cutting device by hand, for instance, when giving attention to the cutting agencies, such as the cutter-blades 17. For providing convenience for such manual rotation, I provide a manual rotating device, shown as a hand-wheel 114, and prefer to normally disconnect the rotative connection between said hand-wheel and the cutter-spindle, so that the hand-wheel may be normally in idle relation to the cutter-spindle. This is accomplished in the present instance by mounting the hand-wheel on a stud 115 of the cutter-spindle, shown as a reduced extension of said spindle, and securing a collar 116 to said stud, for instance, by means of a set-screw 117. The collar is provided with a hole 118 and the hand-wheel is provided with a pin 119, arranged to be received in said hole. A spring 120 between the collar and the hand-wheel normally separate the pin and its hole. If it is desired to rotate the cutter-spindle by hand, the hand-wheel is pushed inwardly to connect the pin and hole, and the cutter-spindle is turned to the desired extent. When the hand-wheel is released, the rotative connection between the hand-wheel and the cutter-spindle is automatically released.

Having thus fully described my invention, what I claim as new, and desire to secure by Letters Patent, is:

1. In wood-working machinery, the combination of a machine-frame comprising a supporting portion for a cutter-spindle, an electric motor comprising a motor-frame, an outer stator and a rotor within said stator, a cutter-spindle, a plurality of bearings on said supporting portion of said machine-frame for said cutter-spindle, said cutter-spindle having an overhanging end integral therewith extending to overhang said bearings, means for securing said rotor to said overhanging end, complemental steadying means between said motor-frame and said overhanging end of said cutter-spindle in line with said first-named bearings for steadying said overhanging end, and means for securing said motor-frame bracketwise to said machine-frame.

2. In wood-working machinery, the combination of a machine-frame comprising a supporting portion for a cutter-spindle, an electric motor comprising a motor-frame, an outer stator fixed thereto and a rotor normally loose and removable within said stator, a cutter-spindle, a plurality of bearings on said supporting portion of said machine-frame for said cutter-spindle, said cutter-spindle having an overhanging end integral therewith extending to overhang said bearings, complemental steadying means between said motor-frame and the outer end of said overhanging end of said cutter-spindle in line with said first-named bearings for steadying said overhanging end, means for securing said rotor to said overhanging end between said complemental steadying means and one of said bearings, means for securing said motor-frame bracketwise to said machine-frame, and means for adjusting said motor-frame on said machine-frame.

3. In wood-working machinery, the combination of a machine-frame comprising a supporting portion for a cutter-spindle, a plurality of bearings thereon for said cutter-spindle, an electric motor comprising a motor-frame, an outer stator fixed to said motor-frame and a normally shaftless rotor arranged for rotation within said stator, an outer steadying part on said motor-frame for said cutter-spindle, said outer steadying part in line with said first-named bearings, a cutter-spindle journaled in all said bearings and having steadying connection with said steadying part, a wood-cutting device secured to said cutter-spindle between said bearings, and means for fixing said rotor to said cutter-spindle between said bearings and said steadying part.

4. In wood-working machinery, the combination of a machine-frame comprising a supporting portion for a cutter-spindle, a plurality of bearings thereon for said cutter-spindle, an electric motor comprising a motor-frame, an outer stator fixed to said motor-frame and a rotor normally loose within said stator, an outer bearing in line with said first-named bearings, a cutter spindle journaled in all said bearings, a wood-cutting device secured to said cutter-spindle between said first-named bearings, and means for fixing said rotor to said cutter-spindle between said first-named bearings and said outer bearing.

5. In wood-working machinery, the combination of a machine-frame comprising a supporting portion for a cutter-spindle, a plurality of bearings thereon for said cutter-spindle, an electric motor comprising a motor-frame, an outer stator fixed to said motor-frame and a rotor normally loose within said stator, an outer bearing in line with said first-named bearings, a cutter-spindle journaled in all said bearings, a wood-cutting device secured to said cutter-spindle between said first-named bearings, means for fixing said rotor to said cutter-spindle between said first-named bearings and said outer bearing, means for securing said motor-frame to said machine-frame, and means for adjusting said outer bearing transversely with relation to said first-named bearings.

6. In wood-working machinery, the combination of a machine-frame comprising a supporting portion for a cutter-spindle, a plurality of bearings thereon for said cutter-spindle, an electric motor comprising a motor-frame, an outer stator fixed to said motor-frame and a rotor normally loose within said stator, an outer bearing in line with said first-named bearings, a cutter-spindle journaled in all said bearings, a wood-cutting device secured to said cutter-spindle between said first-named bearings, means for fixing said rotor to said cutter-spindle between said first-named bearings and said outer bearing, and adjustable means for securing said motor-frame bracketwise to said machine frame.

7. In wood-working machinery, the combination of a machine-frame comprising a supporting portion for a cutter-spindle, a plurality of bearings thereon for said cutter-spindle, an electric motor comprising a motor-frame, a stator fixed thereto and a normally shaftless rotor whose outer periphery is normally concentric and in close proximity within the inner periphery of said stator, a bearing on said motor-frame for the outer end of said cutter-spindle, said first-named bearings and said second-named bearing being in line with each other, an integral cutter-spindle having journal connection with all said bearings, a wood-cutting device fixed to said cutter-spindle between said first-named bearings, means for securing said rotor to said cutter-spindle between said first-named bearings and said second-named bearing, means for securing said motor-frame to said machine-frame in overhanging relation to said machine-frame, and means for adjusting said second-named bearing for alinement with said first-named bearings.

8. In wood-working machinery, the combination of a machine-frame comprising a supporting portion for a cutter-spindle, a plurality of bearings thereon for said cutter-spindle, an electric motor comprising a motor-frame, a stator fixed thereto and a normally shaftless rotor whose outer periphery is normally concentric and in close proximity within the inner periphery of said stator, a bearing on said motor-frame for the outer end of said cutter-spindle, said first-named bearings and said second-named bearing being in line with each other, an integral cutter-spindle having journal connection with all said bearings, a wood-cutting device fixed to said cutter-spindle between said first-named bearings, means for securing said rotor to said cutter-spindle between said first-named bearings and said second-named bearing, a connecting member for overhangingly securing said motor-frame to said machine-frame, means for securing said connecting member to said machine-frame, and adjusting means between said connecting member and said motor-frame for concentric positioning of said stator and said second-named bearing with relation to the axis of rotation of said cutter-spindle.

9. In wood-working machinery, the combination of a machine-frame, a cutter-spindle journaled therein with an overhanging end, an electric motor comprising a motor-frame, a stator secured thereto and a normally shaftless rotor arranged for concentric rotation within said stator, a bracket on said machine-frame, adjusting means between said bracket and said motor-frame for adjusting said stator concentric about the axis of rotation of said cutter-spindle, and an outer steadying part on said bracket having steadying connection with said cutter-spindle.

10. In wood-working machinery, the combination of a machine-frame, a cutter-spindle journaled therein with an overhanging end, an electric motor comprising a motor-frame, a stator secured thereto and a normally shaftless rotor arranged for concentric rotation within said stator, said motor-frame comprising an outer end-wall, an outer bearing thereon for the outer portion of said overhanging end, and means for securing said motor-frame bracketwise to said machine-frame including means for adjusting said stator and said outer bearing concentric to the axial line of said cutter-spindle when journaled in said machine-frame.

11. In wood-working machinery, the combination of a machine-frame, a cutter-spindle journaled therein with an overhanging end, an electric motor comprising a motor-frame, a stator secured thereto and a normally shaftless rotor arranged for concentric rotation within said stator, said motor-frame comprising an outer end-wall, an outer bearing thereon for the outer portion of said overhanging end, means for securing said motor-frame bracketwise to said machine-frame including means for adjusting said stator and said outer bearing concentric to the axial line of said cutter-spindle when journaled in said machine-frame, and manual turning means for said cutter-spindle.

12. In wood-working machinery, the combination of a machine-frame, a cutter-spindle journaled therein with an overhanging end, an electric motor comprising a motor-frame, a stator secured thereto and a normally shaftless rotor arranged for concentric rotation within said stator, said motor-frame comprising an outer end-wall, an outer bearing therein for the outer portion of said over-hanging end, means for securing said motor-frame bracket-wise to said machine-frame including means for adjusting said stator and said outer bearing concentric to the axial line of said cutter-spindle when journaled in said machine-frame, manual turning means for said cutter-spindle, and releasable connecting means between said manual turning means and the outer end of said cutter spindle.

In testimony whereof, I have hereunto signed my name in the presence of two subscribing witnesses.

JAMES E. HIRST.

In presence of:—
PAUL V. CONNOLLY,
DELMA WERNSING.